(12) United States Patent
Garland et al.

(10) Patent No.: US 6,275,571 B1
(45) Date of Patent: Aug. 14, 2001

(54) SYSTEM FOR DIRECT SUPPRESSED RINGING ACCESS OF SUBSCRIBER LINES

(75) Inventors: Stuart M. Garland, Morton Grove; Pulin M. Kinkhabwala, Naperville; David B. Smith, Hinsdale, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/092,122

(22) Filed: Jun. 5, 1998

(51) Int. Cl.$^7$ .................................................. H04M 11/00
(52) U.S. Cl. ............................. 379/106.05; 379/102.01; 379/106.03; 379/106.09; 379/219; 379/207
(58) Field of Search .................. 379/106.05, 207, 379/201, 106, 92.04, 93, 102.01, 106.01, 106.03, 106.09, 219, 229

(56) References Cited

U.S. PATENT DOCUMENTS

| | | | |
|---|---|---|---|
| 5,204,896 | * 4/1993 | Oliver | 379/106.04 |
| 5,243,644 | * 9/1993 | Garland et al. | 379/106.09 |
| 5,359,641 | * 10/1994 | Schull et al. | 379/106.09 |
| 5,369,690 | * 11/1994 | Comfort | 379/106.09 |
| 5,394,461 | * 2/1995 | Garland | 348/14.01 |
| 5,452,343 | * 9/1995 | Garland et al. | 379/106.9 |
| 5,535,267 | * 7/1996 | Schull | 379/106.3 |
| 5,579,381 | * 11/1996 | Courville et al. | 379/201 |
| 5,737,400 | * 4/1998 | Bagchi et al. | 379/142 |
| 5,825,849 | * 10/1998 | Garland et al. | 379/5 |

* cited by examiner

Primary Examiner—Ahmad Matar
Assistant Examiner—Bing Bui
(74) Attorney, Agent, or Firm—Duft, Graziano & Forest, P.C.

(57) ABSTRACT

The system for direct suppressed ringing access of a subscriber line enables the service provider to access subscriber lines from any location, as long as the incoming call is identified and authenticated as a suppressed ringing access call. The central office switch can maintain a list of predefined line numbers that are used by an authorized service provider to perform the suppressed ringing access function. Thus, a call origination on one of these lines is automatically validated as a suppressed ringing connection call. Alternatively, the suppressed ringing connection is requested by the inclusion of a predefined code in the dial string and the central office switch automatically authenticates the identity of the service provider. Manual authorization on a per call basis is available, where the service provider dials the number of a predefined access line, which connects the service provider to a suppressed ringing access apparatus that authenticates the identity of the service provider and their authority to initiate a suppressed ringing access connection to the selected subscriber line. Once the service provider authentication is accomplished, the suppressed ringing access apparatus then forwards the incoming call to the identified subscriber line via a suppressed ringing connection.

20 Claims, 2 Drawing Sheets

SYSTEM FOR DIRECT SUPPRESSED RINGING ACCESS OF SUBSCRIBER LINES

CROSS REFERENCE TO RELATED APPLICATIONS

This application is related to a U.S. patent application, titled "System for Party Line Suppressed Ringing Access of Subscriber Lines" filed on the same date as the present application.

FIELD OF THE INVENTION

This invention relates to subscriber line access systems and, in particular, to a system that provides a user or service provider with direct access to a selected subscriber line via a suppressed ringing connection.

PROBLEM

It is a problem in the field of telemetry monitoring for the telemetry service provider to obtain remote access to the serving central office without the need for dedicated direct trunk connections to the central office system. In telemetry applications, the telemetry equipment to be polled typically resides at the customer premises, such as a residence. The telemetry equipment can comprise utility meters, appliance controllers, medical monitoring equipment, security systems, telephone line test apparatus, and the like. The telemetry equipment is typically connected via the telephone company network interface unit to the serving subscriber line in a manner similar to an extension telephone. The telemetry service provider access to the telemetry equipment is effected by the use of a Central Office Service Unit (COSU) that is connected to the serving central office switch via a plurality of dedicated Utility Telemetry Trunks (UTTs). In operation, the telemetry application user, such as a utility company, dials or is directly connected to the Central Office Service Unit that functions to connect the telemetry applications user via one of the dedicated Utility Telemetry Trunks to the serving central office switch, which then provides a suppressed ringing connection to the selected subscriber line. The telemetry applications controller collects data from the polled telemetry equipment and the trunk connection is then dropped. An alternative architecture supports direct access using the emulation of a Central Office Service Unit over E&M analog or digital trunking. The Central Office Service Unit functionality (the support of the Utility Telemetry Trunk protocol) may be emulated by a personal computer or workstation at the server site and not require an adjunct Central Office Service Unit at the central office.

Existing Central Office Service Units can be connected to a number of serving central office switches and therefore represents a single point of failure. In addition, the provision of a plurality of dedicated Utility Telemetry Trunks for each serving central office switch represents a significant investment in limited functionality equipment that may be only infrequently used. There is presently no method or apparatus that enables a service provider to remotely access the subscriber lines via a suppressed ringing connection for the purpose of telemetry monitoring.

SOLUTION

The above-described problems are solved and a technical advance achieved in the field by the system for direct suppressed ringing access to both a subscriber line and the equipment that is connected to this subscriber line. The present system makes use of intelligence in the serving central office switch that identifies the suppressed ringing access nature of the incoming call. When the incoming call is identified as a suppressed ringing access call and the authorization of the calling party to initiate a suppressed ringing access is validated, the subscriber line is accessed via a suppressed ringing connection and the access operation proceeds in well known fashion to retrieve collected telemetry data from telemetry equipment connected to the subscriber line or perform tests on the subscriber line or equipment connected thereto, or perform any other data collection function on the selected subscriber line.

The present system for direct suppressed ringing enables service providers to access a subscriber line without the need for the Central Office Service Units and their associated dedicated Utility Telemetry Trunks. The subscriber line can be accessed from any location, as long as the incoming call is identified and authenticated as a suppressed ringing access call. There are numerous methods proposed for identifying the incoming call as a suppressed ringing access call and these can be broadly classified as either preauthorized call originations or service provider authorization on a per call basis. Included in the first category, the serving central office switch can maintain a list of predefined line numbers that are used by an authorized service provider to perform the suppressed ringing access function. When an incoming call is received by the central office switch that serves these predefined lines, the serving central office switch scans the Automatic Number Identification (ANI) of the incoming line to validate the identity and authorization of the calling party. If the calling party is an authorized service provider, the serving central office triggers an intelligent network function to signal the central office switch that serves the identified subscriber line to automatically cause the initiation of a suppressed ringing connection from the service provider to the identified subscriber line based upon the validated identity of the call originating line. One other calling party validation arrangement is for the ANI information to be passed to the central office switch that serves the identified subscriber line for calling party validation. Alternatively, the suppressed ringing connection is accomplished by the inclusion of a predefined code in the dial string by the service provider to identify this call origination as a suppressed ringing access call. This process is the same as the activation of a subscriber line function, such as deactivation of call waiting service. Again, the serving central office switch scans the Automatic Number Identification (ANI) of the call originating line to validate the identity and authorization of the calling party and triggers an intelligent network function that automatically causes the initiation of a suppressed ringing connection to the identified subscriber line based upon the validated identity of the call originating line and the prefix code that indicates this as a suppressed ringing call connection.

The second category of suppressed ringing access call identification includes manual authorization on a per call basis where the service provider dials the number of a predefined access line, which connects the service provider to a suppressed ringing access apparatus that authenticates the identity of the service provider and their authority to initiate a suppressed ringing access connection to the selected subscriber line. Once the service provider authentication is accomplished, the suppressed ringing access apparatus then forwards the incoming call to the identified subscriber line via a suppressed ringing connection.

DETAILED DESCRIPTION

Figure 1:
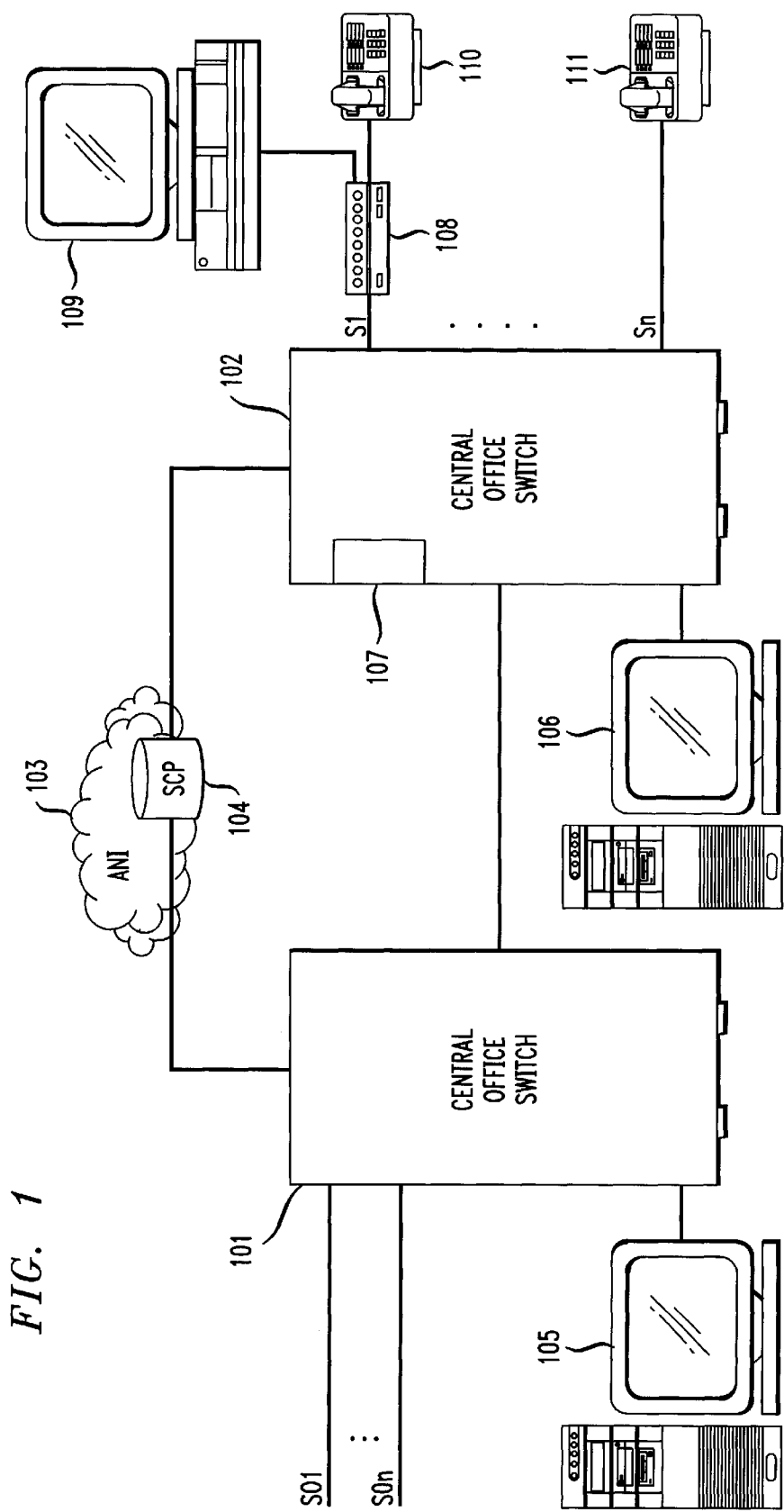
FIG. 1 illustrates in block diagram form the system for remotely accessing a subscriber line via a suppressed ringing connection and an operating environment in which such system is typically located.

FIG. 1 illustrates in block diagram form the system for remotely accessing a subscriber line via a suppressed ringing connection and an operating environment in which such system is typically located. In particular, a switching system, such as the central office switch 102, serves a plurality of local loops S1–Sn, termed "subscriber lines" herein. Each subscriber line S1 is typically terminated with some form of customer premise equipment, such as telephone station set, modem, telemetry equipment or combinations of such equipment. In the present example, subscriber line S1 is terminated with a telephone station set 110 as well as a network interface unit 108 that serves to interconnect telephone station set 110 and at least one telemetry apparatus 109 to the subscriber line S1. This telemetry apparatus 109 is shown as a single element, but can comprise a plurality of elements, such as: utility meter telemetry equipment, appliance controllers, medical monitoring equipment and the like, that is accessible by means of a suppressed ringing connection.

SUPPRESSED RINGING CONNECTIONS

A suppressed ringing connection comprises a direct physical connection through a switching system to a selected subscriber line, with the provision of no features for that subscriber line. What this entails is the deactivation (or disregarding) of all local exchange carrier provided services, such as: call waiting, call forwarding, call blocking, to thereby enable the uninterrupted physical connection of the accessing service provider to the selected subscriber line. The physical interconnection of the service provider to the subscriber line enables the service provider to perform tests on this physical link and/or transmit any desired control signals directly to whatever apparatus is connected to the subscriber line and receive any responses therefrom.

Traditionally, suppressed ringing connections were used by utility companies to provide remote utility meter reading functions. This was accomplished by the use of a Central Office Service Unit (COSU) that was directly connected to the central office switch via dedicated Utility Telemetry Trunks (UTT) to thereby enable the COSU to connect the utility company telemetry polling unit to concurrently access a plurality of subscriber lines S1–Sn via the plurality of UTTs. However, the provision of dedicated UTTs presents a problem due to the fact that this equipment is expensive to provide and maintain even though its use is infrequent. However, existing systems are limited to such an architecture due to the limited functionality that was available in the serving central office switch.

Advances in central office switch technology have provided additional data provisioning opportunities. In particular, the identity of a calling party and validation of their authenticity can be effected in a reliable manner and this data passed along through intervening local exchange carrier switches to the serving central office to thereby now enable the present system for remotely accessing a subscriber line via a suppressed ringing connection to permit individual access directly to a subscriber line via a suppressed ringing connection. Such direct access opens the opportunity for many service providers to access equipment located at the subscriber premises and connected to the subscriber line. Data collection and data transmission capabilities are therefore now available to any authorized service provider via a suppressed ringing connection on the subscriber line without the necessity of providing a dedicated line for this purpose.

DIRECTLY ACCESSING A SUBSCRIBER LINE VIA A SUPPRESSED RINGING CONNECTION

Figure 2:
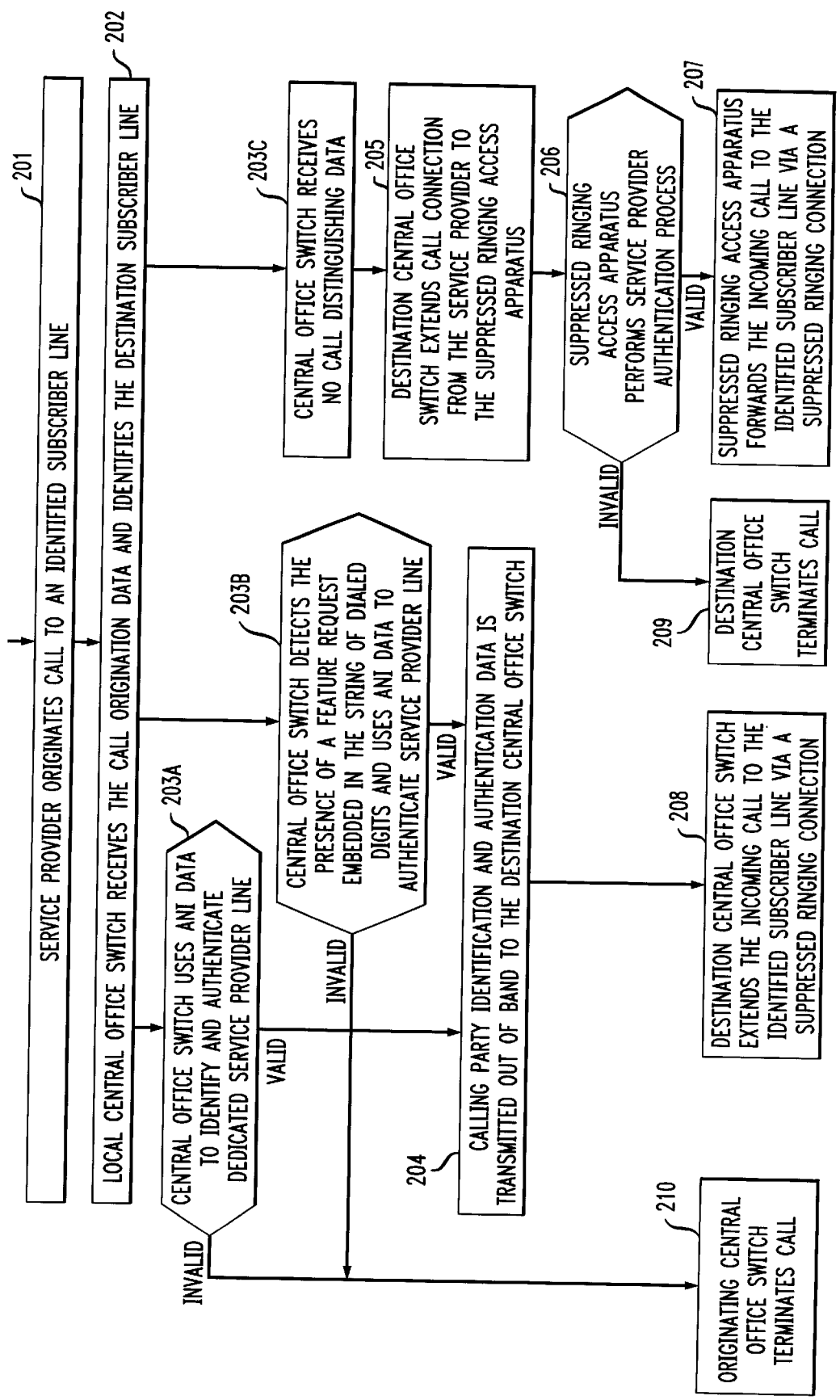
FIG. 2 illustrates in flow diagram form the operational steps taken by the present system for remotely accessing a subscriber line via a suppressed ringing connection to perform a typical subscriber line access operation.

FIG. 2 illustrates in flow diagram form the operational steps taken by the present system for remotely accessing a subscriber line via a direct suppressed ringing connection to perform a typical subscriber line access operation. The process begins at step 201 where the service provider 105 originates a subscriber line access call to an identified subscriber line S1 served by a selected central office switch 102. The local central office switch 101 receives the call origination data at step 202 from the service provider 105 and identifies the destination subscriber line S1. The present example illustrates the extension of this call connection from an originating central office switch 101 to a destination central office switch 102, but the service provider 106 could alternatively be connected to the destination central office switch 102. For the purpose of illustrating the present system, the multiple central office switch example is used herein but is not intended to limit the scope of the described concept.

The nature of the call can be determined by one of a plurality of methods. In particular, at step 203A, the central office switch 101 can use the Automatic Number Identification ANI data that is automatically generated by central office switch 101 as part of the call origination by the service provider 105 to identify this service provider line as one dedicated for suppressed ringing connection access. Thus, if the ANI either matches the list of dedicated lines stored in the memory of central office switch 101 or central office switch 102 (or an adjunct data processor associated therewith), or triggers an AIN lookup and subsequent access to service control point 104, the call origination is designated as a suppressed ringing connection request or abbreviated ringing connection request. Alternatively, at step 203B, central office switch 101 can detect the presence of a feature request embedded in the string of digits dialed by the service provider 105 as part of the call origination. In particular, the service provider 105 can prepend a feature request code (*8*, for example) to the dialed digits that identify the destination subscriber line S1 to thereby request a suppressed ringing connection access to this destination. Furthermore, the feature request code can include data digits that further characterize the suppressed ringing call, such as call duration, type of data collection, abbreviated ring duration, and the like. The central office switch 101 then designates the call origination as a suppressed ringing connection request due to the presence of this code if the ANI data that is automatically generated by central office switch 101 as part of the call origination by the service provider 105 also identifies this service provider line as one dedicated for suppressed ringing connection access. In either case, the line from which the service provider 105 originates the call is automatically identified by the local central office switch 101 and, if this line is defined as being authorized to initiate direct suppressed ringing connections to subscriber lines (and possibly with the granularity that authorization is only to a certain class of subscriber lines), this data along with the calling party identification is transmitted out of band to the local central office switch 102 that serves the selected subscriber line S1 at step 204. This is accomplished by the use of the signal control point 104 of the intelligent network 103 that interconnects the central office switches 101, 102. Thus, when the call connection from the originating central office switch 101 reaches the terminating local central office switch 102, the call setup data is concurrently received via an out of band data channel 103. Upon receipt of the incoming call and the out of band call control data that associates a request a suppressed ringing connection access with the call connection to the designated subscriber line S1, the destination central office switch 102 establishes a suppressed ringing connection to the designated subscriber line S1 in well known fashion at step 208. If, however, the authentication of the service provider 105 fails, the call connection is rejected at step 210 and call processing exits.

The second category of suppressed ringing access call identification includes authorization on a per call basis. Thus, at step 203C, there is no indication from the service provider 105 to the central office switch 101 that the call origination is a suppressed ringing access connection, since the service provider 105 dials the number of a predefined access line, which connects the service provider 105 to a suppressed ringing access apparatus 107 that authenticates the identity of the service provider 105 and their authority to initiate a suppressed ringing access connection to the selected subscriber line S1. Thus, at step 205, the central office switch 102 connects the call connection from the service provider 105 to the suppressed ringing access apparatus 107. At step 206 the suppressed ringing access apparatus 107 performs a service provider authentication process, which comprises a validation, using well known authentication techniques such as passwords and the use of ANI data if available, of both the identity of the service provider 105 as well as their authority to obtain a suppressed ringing access connection to the destination subscriber line S1. This service provider authentication process can include access to a service profile for the service provider 105 to determine specific service control information, such as queue timing, call priority, and the like. Once the service provider authentication is accomplished, the suppressed ringing access apparatus 107 then forwards the incoming call to the identified subscriber line S1 via a suppressed ringing connection at step 207. However, if the service provider 105 authentication fails, the destination central office switch 102 rejects the call connection and call processing exits at step 209.

Once connected to the subscriber line, the service provider 105 can perform the desired telemetry or test operation. In this manner, the service provider 105 can obtain direct suppressed ringing connection access to any subscriber line S1–Sn or SO1–SOn served by any switching system 102, 101 without the need to provision each switching system with a Central Office Service Unit (COSU) that is connected to the serving central office switch via a plurality of dedicated Utility Telemetry Trunks (UTTs).

What is claimed is:

1. Apparatus for enabling a service provider served by a first central office switch to directly access a subscriber line that is served by a second central office switch via a suppressed ringing connection, comprising:

means, located in said first central office switch and responsive to receipt of an incoming call from a service provider, for identifying the suppressed ringing access nature of the incoming call;

means, located in said first central office switch, for receiving data from said service provider identifying a subscriber line served by said second central office switch;

means, located in said first central office switch, for validating the authority of said service provider to obtain suppressed ringing connection access to said identified subscriber line;

means for transmitting data from said first central office switch to said second central office switch identifying the suppressed ringing access nature of the incoming call and the authority of said service provider to obtain suppressed ringing connection access to said identified subscriber line the authority of said service provider to obtain suppressed ringing connection access to said identified subscriber line; and means, located in said second central office switch, for activating suppressed ringing connection access for said service provider to said identified subscriber line.

2. The apparatus of claim 1 wherein said means for identifying comprises:

means for automatically identifying a line used by said service provider to originate said incoming call as dedicated to obtain suppressed ringing access to subscriber lines.

3. The apparatus of claim 1 wherein said means for identifying comprises:

means for receiving data from said service provider requesting suppressed ringing access to said identified subscriber line.

4. The apparatus of claim 3 wherein said means for identifying further comprises:

means, responsive to said data received from said service provider requesting suppressed ringing access to said identified subscriber line, for identifying said received data as a valid request to obtain suppressed ringing access to said identified subscriber line.

5. The apparatus of claim 1 wherein said means for validating comprises:

means for automatically identifying an authorized nature of said line used by said service provider to originate said request to obtain suppressed ringing access to said identified subscriber line.

6. The apparatus of claim 5 wherein said means for automatically identifying comprises:

means for determining an identity of said line used by said service provider to originate said request to obtain suppressed ringing access to said identified subscriber line; and means for verifying said identity matches an entry stored in a list, stored in a memory, of lines authorized to obtain suppressed ringing access to subscriber lines.

7. The apparatus of claim 5 wherein said means for activating comprises:

means, responsive to said identified authorized nature of said line used by said service provider and said request to obtain suppressed ringing access to said identified subscriber line, for directly connecting said service provider to said identified subscriber line via a suppressed ringing connection.

8. The apparatus of claim 1 wherein said means for validating comprises:

means for establishing a call connection from a line, used by said service provider to originate said incoming call, to a service provider authenticating apparatus;

means for receiving data in said service provider authenticating apparatus from said service provider that is requesting suppressed ringing access to said identified subscriber line to authenticate an identity of said service provider; and means for verifying said received data matches an entry stored in a list, stored in a memory, of service providers authorized to obtain suppressed ringing access to subscriber lines.

9. The apparatus of claim 8 wherein said means for validating further comprises:

means, responsive to said means for verifying, for forwarding said call connection from said service provider to said identified subscriber line via a suppressed ringing connection.

10. The apparatus of claim 1 wherein said means for transmitting comprises:

means connected to said first central office switch and said second central office switch for communicating data therebetween in an out of band manner.

11. A method for enabling a service provider served by a first central office switch to directly access a subscriber line that is served by a second central office switch via a suppressed ringing connection, comprising the steps of:

identifying, in said first central office switch in response to receipt of an incoming call from a service provider, the suppressed ringing access nature of the incoming call;

receiving, in said first central office switch, data from said service provider identifying a subscriber line served by said second central office switch;

validating, in said first central office switch, the authority of said service provider to obtain suppressed ringing connection access to said identified subscriber line;

transmitting data from said first central office switch to said second central office switch identifying the suppressed ringing access nature of the incoming call and the authority of said service provider to obtain suppressed ringing connection access to said identified subscriber line the authority of said service provider to obtain suppressed ringing connection access to said identified subscriber line; and activating, in said second central office switch, suppressed ringing connection access for said service provider to said identified subscriber line.

12. The method of claim 11 wherein said step of identifying comprises:

automatically identifying a line used by said service provider to originate said incoming call as dedicated to obtain suppressed ringing access to subscriber lines.

13. The method of claim 11 wherein said step of identifying comprises:

receiving data from said service provider requesting suppressed ringing access to said identified subscriber line.

14. The method of claim 13 wherein said step of identifying further comprises:

identifying, in response to said data received from said service provider requesting suppressed ringing access to said identified subscriber line, said received data as a valid request to obtain suppressed ringing access to said identified subscriber line.

15. The method of claim 11 wherein said step of validating comprises:

automatically identifying an authorized nature of said line used by said service provider to originate said request to obtain suppressed ringing access to said identified subscriber line.

16. The method of claim 15 wherein said step of automatically identifying comprises:

determining an identity of said line used by said service provider to originate said request to obtain suppressed ringing access to said identified subscriber line; and verifying said identity matches an entry stored in a list, stored in a memory, of lines authorized to obtain suppressed ringing access to subscriber lines.

17. The method of claim 15 wherein said step of activating comprises:

directly connecting, in response to said identified authorized nature of said line used by said service provider and said request to obtain suppressed ringing access to said identified subscriber line, said service provider to said identified subscriber line via a suppressed ringing connection.

18. The method of claim 11 wherein said step of validating comprises:

establishing a call connection from a line, used by said service provider to originate said incoming call, to a service provider authenticating apparatus;

receiving data in said service provider authenticating apparatus from said service provider that is requesting suppressed ringing access to said identified subscriber line to authenticate an identity of said service provider; and verifying said received data matches an entry stored in a list, stored in a memory, of service providers authorized to obtain suppressed ringing access to subscriber lines.

19. The method of claim 18 wherein said step of validating further comprises:

forwarding, in response to said step of verifying, said call connection from said service provider to said identified subscriber line via a suppressed ringing connection.

20. The method of claim 11 wherein said step of transmitting comprises:

communicating data from said first central office switch to said second central office switch in an out of band manner.

* * * * *